United States Patent
Williams et al.

[11] Patent Number: 5,104,432
[45] Date of Patent: Apr. 14, 1992

[54] PROCESS FOR FIBERIZING MOLTEN GLASS OR REFRACTORY OXIDE MATERIALS

[75] Inventors: John K. Williams, Faringdon, United Kingdom; Leonard E. Olds, Castle Rock; Michael J. Cusick, Denver, both of Colo.

[73] Assignees: Manville Corporation, Faringdon, United Kingdom; Tetronics Research & Development Co., Ltd., Denver, Colo.

[21] Appl. No.: 524,275

[22] Filed: May 16, 1990

[30] Foreign Application Priority Data

May 18, 1989 [GB] United Kingdom ................ 8911441

[51] Int. Cl.$^5$ ................ C03B 37/05; C03B 37/10; C03B 19/00
[52] U.S. Cl. ................ 65/2; 65/5; 65/30.1; 65/128; 65/136; 219/121.38; 373/20; 373/22
[58] Field of Search ................ 65/1, 5, 6, 8, 128, 65/136, 326, DIG. 4, 2, 30.1; 373/27, 18, 22, 20; 219/121.38; 266/200

[56] References Cited

U.S. PATENT DOCUMENTS

| | | | |
|---|---|---|---|
| 1,401,922 | 12/1921 | Peiler | 65/128 |
| 3,106,594 | 10/1963 | Beasleye et al. | 219/121.38 X |
| 3,508,904 | 4/1970 | Keefer | 65/326 |
| 3,714,390 | 1/1973 | Foex et al. | 219/121.38 X |
| 4,351,660 | 9/1982 | Plantard et al. | 65/5 |
| 4,402,724 | 9/1983 | Weisenburger et al. | 65/129 |
| 4,545,798 | 10/1985 | Matesa | 65/27 |
| 4,759,787 | 7/1988 | Winterburn | 65/30.1 |

*Primary Examiner*—Robert L. Lindsay
*Attorney, Agent, or Firm*—Beveridge, DeGrandi & Weilacher

[57] ABSTRACT

A process for the treatment of a continuous or perturbated stream of liquid material, which process consists essentially of passing the said stream of liquid material through a plasma arc coupling zone in which at least two plasma arcs are coupled at the surface of the liquid stream in order to raise both the bulk temperature of the stream and the temperature of the outer surface of the stream of material, thereby to effect a treatment of the stream selected from thermal, chemical, and a mixture of thermal and chemical.

22 Claims, 5 Drawing Sheets

PROCESS FOR FIBERIZING MOLTEN GLASS OR REFRACTORY OXIDE MATERIALS

The present invention relates to a process for the treatment of liquid materials and, in particular, to a process for the treatment of molten glass or refractory or other materials from which fibres and other products may be formed.

In the manufacture of fibres from glass or from refractory or other materials, the molten substance is poured or allowed to flow from the melting apparatus to the fibre forming equipment (the "fiberizer") in the form of a liquid stream, either as a continuous or a perturbated stream. As soon as this liquid stream leaves the higher temperature zone within the melter it comes into contact with a colder orifice as well as with the cooler air surrounding the apparatus. The surface of the liquid stream is thereby cooled, forming a colder liquid "skin".

Figure 1:
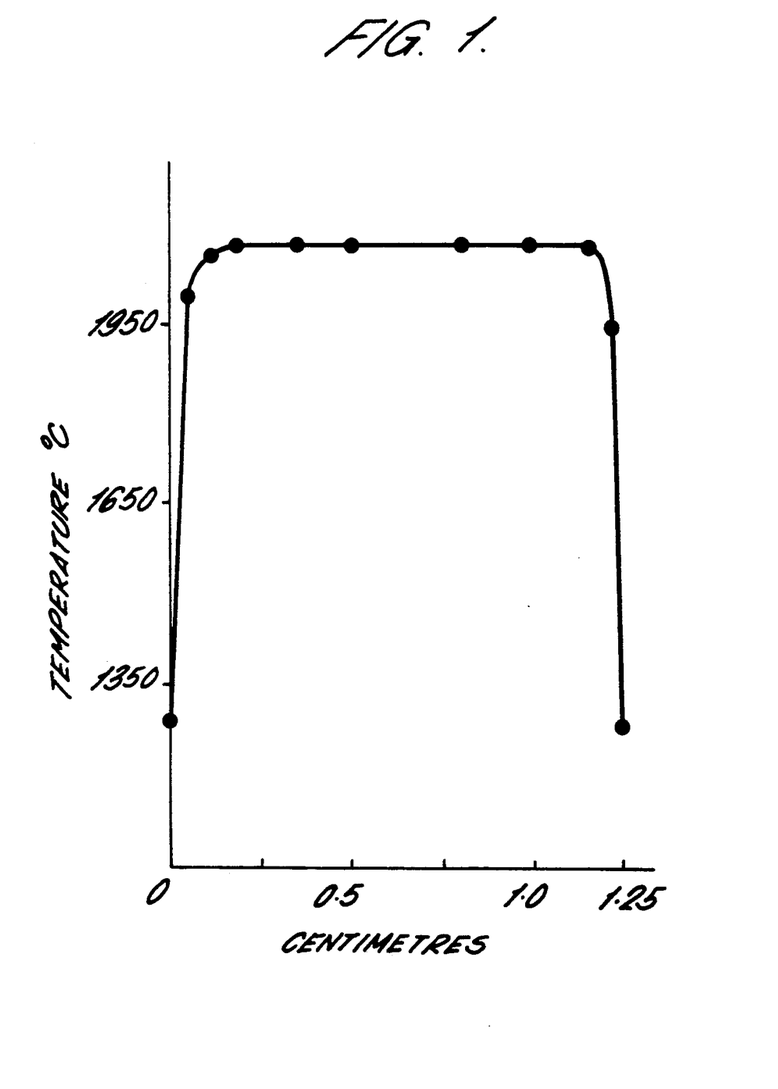
FIG. 1 is an illustration of a typical thermal gradient across a stream of a molten refractory oxide emerging from a melting bath.

FIG. 1 illustrates a typical thermal gradient across a stream of a molten refractory oxide emerging from a melting bath. In this example, the stream is nominally circular in cross-section and of 1.25 centimeters diameter. The temperature across the central zone is approximately 2000 degrees centigrade and is uniform, falling rapidly to an average of approximately 1340 degrees centigrade across the outermost 0.125 centimeters. Accordingly, the cool region is in the form of a regular annulus surrounding the hotter centre and in this particular case, it can be calculated that approximately 36% of the stream area is "cold".

The "cold" skin is responsible for the formation of "shot". By the term "shot" is meant particles of a material which are often spherical or teardrop in shape which have failed to elongate into fibres.

The production of shot degrades the finished fibre product and can also lead to high production losses (in its worst case, greater than 50%). In practice, it has been shown that the percentage "cold" area of the stream approximates to the percentage of shot produced.

In many processes for the production of fibres, the fibres are formed from droplets which are flung off rapidly spinning wheels, or which are blown pneumatically. The fibres form as tails that are pulled from the molten droplet. Ideally, when the temperature and the intial size of the droplet are optimum, the droplet will all be used up and disappear just as it becomes too cold to form additional fibre. When the droplet is too cold or too large in size, it forms into coarse unfiberized shot particles which significantly detract from the value of the fibre. For the most part, the shot is entrained within and is part of the fibre product, however, under certain conditions, shot can break free from the fibre stream and exist as distinct and discrete particles.

Shot formation is undesirable and the less shot produced, the better the yield for the same melting energy and quantity of feedstock and in the case of manufacturing glass fibre for insulation purposes, the better the insulating properties per unit weight of insulate. Traditionally, the established practice to reduce shot losses has been to apply a degree of superheat to the melting bath and to heat the exit orifice thereof. Unfortunately, this combination only minimally reduces the shot losses and has the added disadvantage of:

(i) accelerating the erosion of the refractory lining of the melting bath, thus increasing the frequency of expensive rebuilds with associated equipment downtime and loss of production; and (ii) damaging the outlet orifice. In glass melting furnaces, the outlet orifice is typically made from a precious metal, for example, platinum or iridium, which, throughout its life will be eroded away, the process being exacerbated by any increase in temperature of the melt and by heating the orifice to retard the formation of the "cold" skin on the outlet stream. As the orifice becomes enlarged, so the emergent stream will increase in diameter and flow rate, rendering control of the quality and fibre production rate difficult. To compensate for orifice enlargement, the use of a tapered needle positioned in the aperture has been adopted.

We have now developed a method for the reduction of shot formation in which the need to superheat the melting bath and to heat the outlet orifice is overcome.

Accordingly, the present invention provides a process for the treatment of a continuous or perturbated stream of liquid material, which process comprises passing the said stream of liquid material through a zone in which at least two plasma arcs are coupled at the surface of the liquid stream in order to raise both the bulk temperature of the stream and the temperature of the outer surface of the stream of material, thereby to effect thermal and/or chemical treatment of the said stream.

The plasma arcs are generated by a system comprising at least two plasma electrodes in which at least one electrode acts as the cathode and at least one electrode acts as the anode. In this way, the liquid stream may be both thermally and/or chemically conditioned by passage through a zone of extremely intense energy, sufficient to raise the temperature and ameliorate the problems associated with thermal non-uniformity and, in particular, the formation of a "cold" skin.

Materials which may be treated according to the process of the present invention include glass compositions, wollastonitic compositions, mineral wool compositions, other silicate compositions and refractory oxide compositions from which fibres may be made.

The plasma electrodes are preferably inclined at an angle to one another, preferably in a symmetrical disposition to the flow of molten material. A wide range of electrode angles are possible ranging from paralleling the stream flow in either direction and to all angles in between. For optimum temperature pick up by the stream, together with stream stability, it is preferred to have the electrodes pointing downstream with the angle between the electrodes being in the range of from 100° to 140°, i.e. the electrodes being at an angle of from 50° to 70° to the vertical.

The spacing between the electrode tips influences the thermal coupling efficiency or the ratio of heat absorbed by the liquid stream to the amount of heat in the input plasma power, including transformer heat. The electrode tips may be in close proximity to the melt stream or they may be widely spaced depending upon electrode sizing and input power. For small 0.6 cm diameter electrodes operating at low power loadings of less than 1 KW, the electrodes may almost touch the melt stream. For larger electrode diameters with power loadings of several megawatts, the electrodes can be widely spaced as long as the two or more plasma arcs electrically couple to each other and to the liquid stream. In general the most efficient coupling is with the electrodes as close to the liquid stream as possible. As the electrode tips are moved away from the stream the convective and radiant losses from the plasma gases increase. The optimum spacing may depend upon factors such as the need for providing extra space for the stream to wander without touching the electrodes.

Whilst all gases can be ionized to form a plasma, preferred gases for use are He, Ne, Ar, $O_2$, $N_2$ and $NH_3$, or mixtures or combinations thereof, with argon and nitrogen being the most preferred gases for use.

Using the arrangement of plasma electrodes described above, it will be apparent that there is no requirement for a return electrical connection, as the conductive path is via the plasma gases through the surrounding gaseous medium (in the majority of cases, air) and dependent upon the material being conditioned, the conduction may pass through the molten flow stream itself. Accordingly, there are no contamination problems using the process of the invention.

The arrangement of plasma electrodes to condition the stream of molten material may be easily incorporated into existing production systems and the outlet orifice of the melter need not be heated. Indeed, it may be preferable to introduce an element of cooling at the outlet orifice, thus preserving orifice life, obviating both the necessity of needle control to regulate the outlet flow and the necessity of orifice cleaning.

Alternatively, the material may be melted in a plasma arc furnace such as, for example, a plasma arc furnace as described in our co-pending patent application Ser. No. 07/433,371 now abandoned. In this arrangement two plasma electrodes are used in a furnace, one electrode acting as the anode and one as the cathode. The use of a plasma furnace to melt the material is advantageous in that high temperatures are readily reached and maintained in the furnace. If desired, the outlet from the furnace may be cooled for example using an air or water jacket.

The present invention will be further described with reference to the accompanying drawings, in which.

FIG. 1 has been previously described and no further explanation thereof is required.

Figure 2:
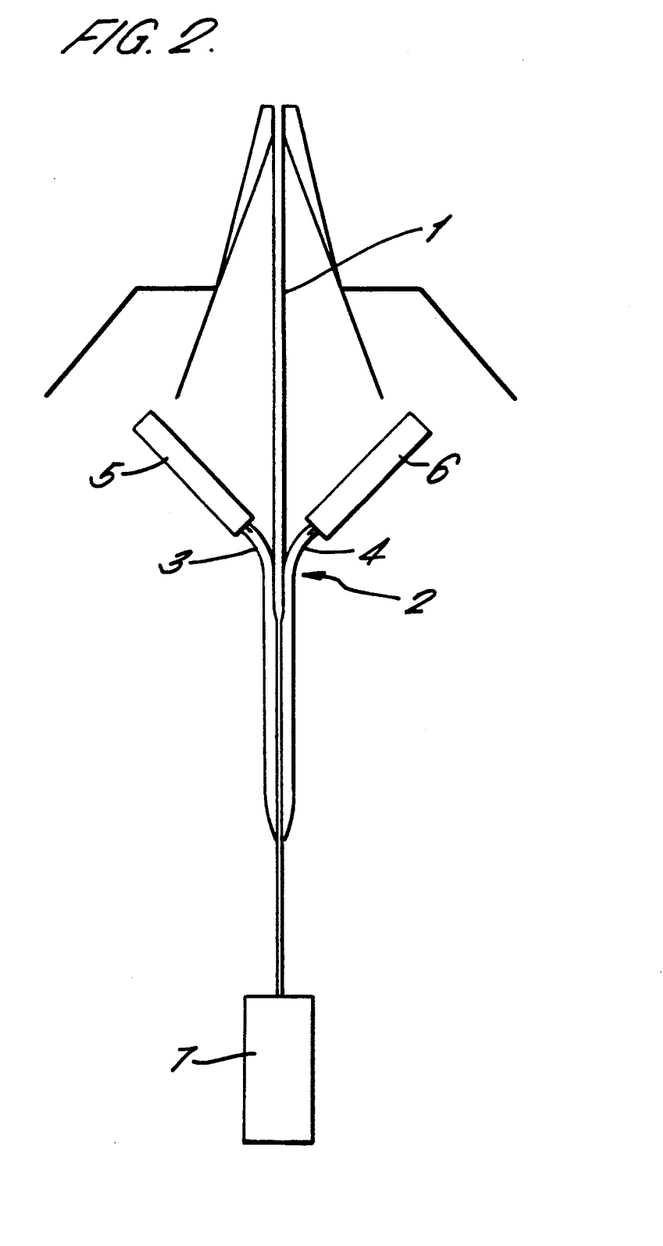
FIG. 2 is a schematic diagram of two plasma arc electrodes positioned in such a way that the plasma arcs generated couple at the surface of a molten stream.

Referring to FIG. 2, a stream of a molten material such as glass emerges from a melting apparatus (not shown). The stream 1 passes through a zone 2 where two plasma arcs 3 and 4 couple at the surface of the molten glass stream. The plasma arcs 3 and 4 are generated by plasma electrodes 5 and 6, respectively, electrode 5 acting as the anode and electrode 6 acting as the cathode. The plasma arcs are generated by the electrodes 5 and 6 using argon as the ionizing gas. The rate of flow of argon through the electrodes may vary, depending upon various factors. Suitable flow rates will generally be in the range of from 1 to 500 liters per minute of argon, depending upon electrode size. The rate of flow of argon through the anode and cathode need not necessarily be the same.

Figure 3:
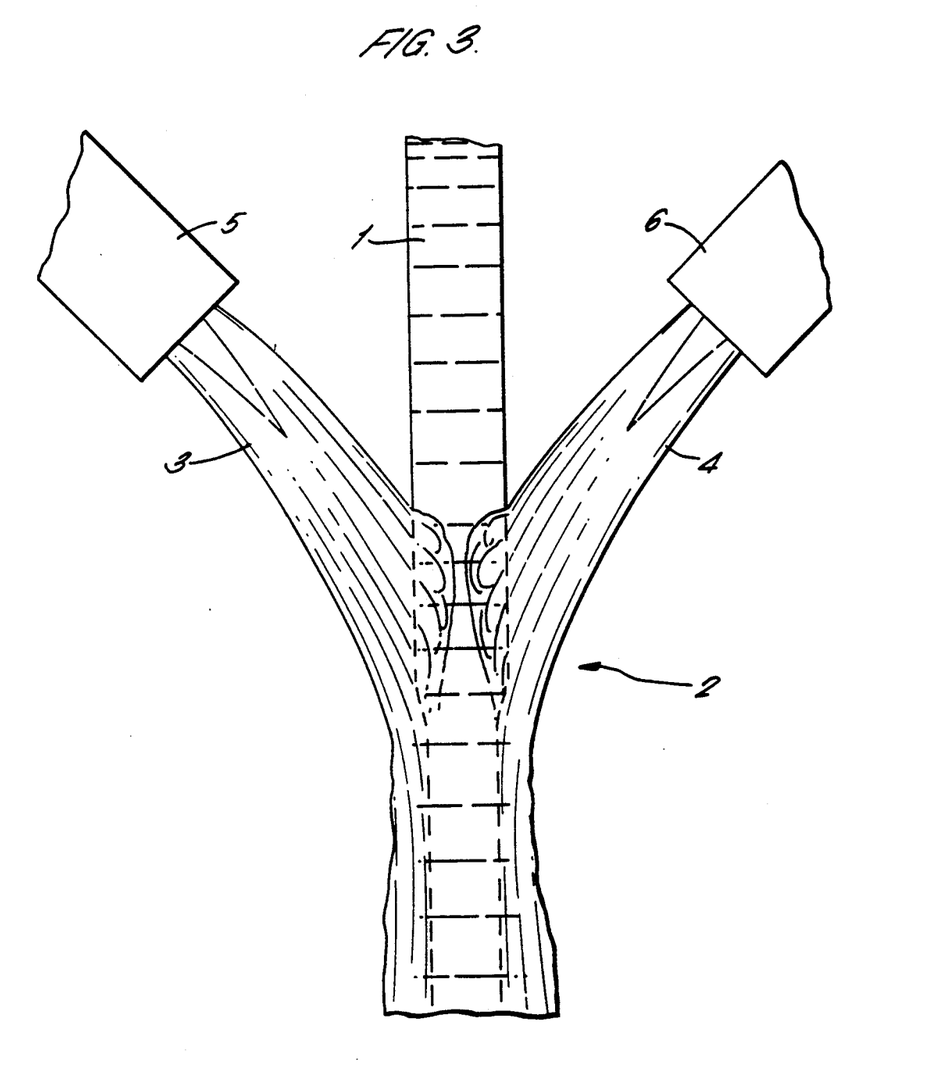
FIG. 3 is an enlarged view of a part of FIG. 2.

FIG. 3 is an enlarged view of the zone of FIG. 2 in which the plasma arcs couple. Like parts are detailed by like reference numerals. It can readily be seen from this Figure that the plasma electrodes 5 and 6 may be inclined downstream at an angle to one another, preferably at a downstream included angle in the range of from 100° to 140°, i.e. at 50° to 70° to the vertical. The electrodes are, furthermore, preferably symmetrically disposed about the vertical flow of the molten stream of material.

The conditioned molten stream leaving the plasma arc coupling zone then passes to a unit 7 shown in FIG. 2 where fibres are formed from the molten material in a known manner.

Figure 4:
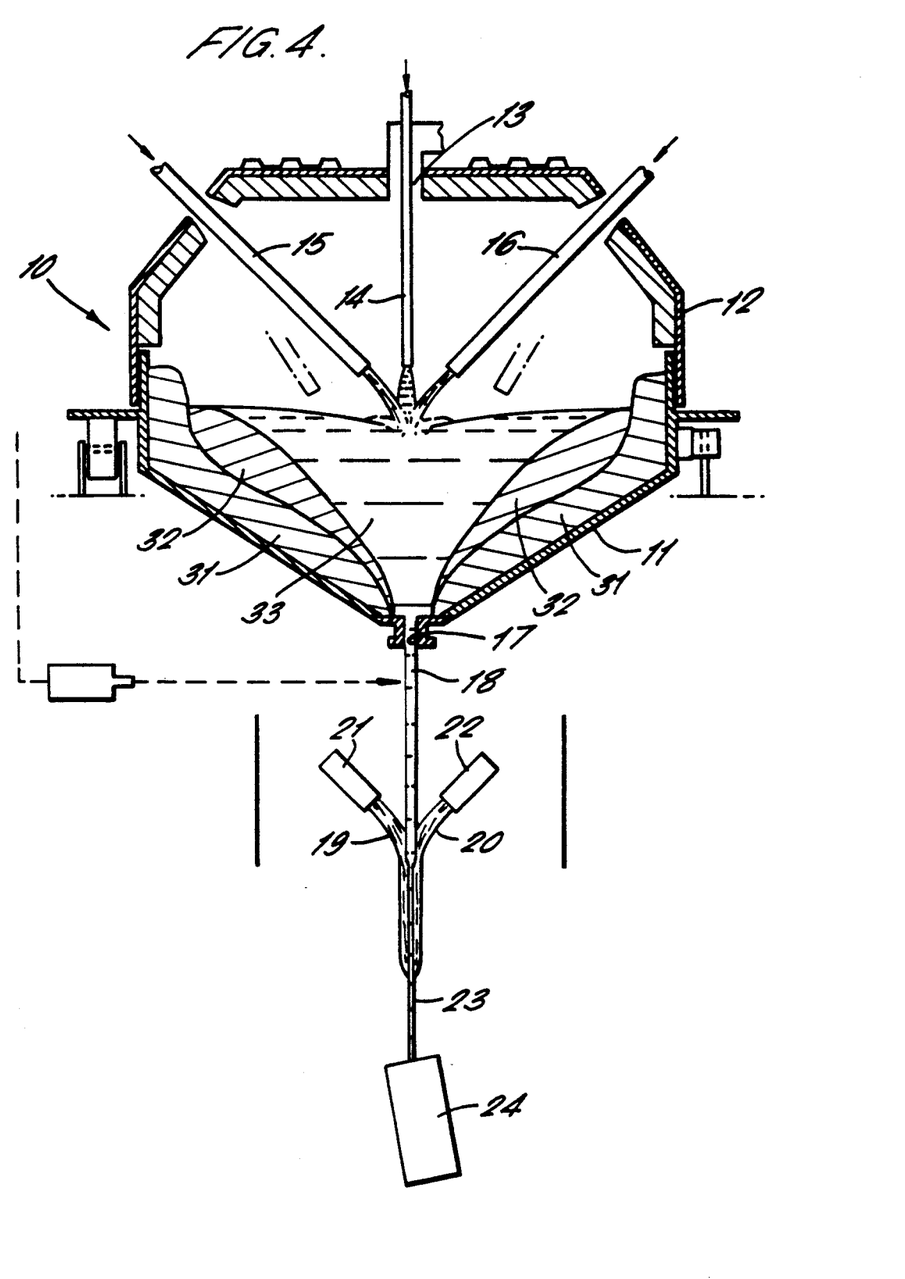
FIG. 4 is an apparatus for melting a material together with the plasma arc conditioning of the present invention.

Referring to FIG. 4, an apparatus for melting a material and conditioning a molten stream thereof is shown.

The apparatus comprises a furnace for melting the material generally shown at 10. The furnace comprises two parts, namely a rotatable shell 11 and a fixed upper shell 12. The rotatable shell 11 is connected to a rotation mechanism which is not shown in detail. The fixed upper shell 12 is equipped with a central feed hole 13 through which feed tube 14 extends. The feed material may be introduced into the furnace at any rate appropriate to the rate at which the material can be melted in the furnace. The fixed upper shell is further provided with twin plasma electrodes, electrode 15 acting as the anode and electrode 16 acting as the cathode. The gas supply to these plasma electrodes is argon. The arcs provided by the plasma electrodes 15 and 16 impinge upon the feedstock introduced into the furnace and melt it. The rotatable shell 11 of the furnace is provided with a tapping hole 17 through which the molten material emerges. The tapping hole 17 may be cooled, if desired, for example by means of an air or water jacket. The shell 11 is rotated during the melting operation in order to assist in the distribution of heat throughout the molten material and to assist in the even melting of the feed material. The walls of the rotatable shell 12 are protected by an autogenous lining of the feedstock material, a solid shell 31 of feed material being formed adjacent to the walls and a region of skummy melt 32 being formed next to this. The hottest liquid zone 33 is at the centre of the furnace. A melting furnace of this type is more fully described in our abandoned copending patent application Ser. No. 07/433,371.

A stream of molten material 18 emerges from the tapping hole 17. The stream of molten material then passes to a cooling zone where two plasma arcs 19 and 20 couple at the surface of the molten stream. The plasma arcs 19 and 20 are generated by plasma electrodes 21 and 22, respectively, electrode 21 acting as the anode and electrode 22 acting as the cathode. The conditioned stream 23 of molten material then passes to an apparatus 24 for the formation of fibres therefrom.

For refractory melting applications, the temperatures in the various parts of the system may typically be 1730° C. at the point of impingement of the plasma arcs on the surface of the melt, 1650° within the body of the melt, 1600° C. within the stream between the outlet orifice and the plasma arc stream conditioning system, and an optimum stream temperature of 1780° C. after the conditioning apparatus prior to entry to the fibre forming apparatus.

In the apparatus described above with reference to FIG. 4, the molten stream 18 emerging from the tapping hole 17 may be passed in front of a radiation sensing device which is connected to suitable circuitry and mechanisms to control the rate at which the stream of molten material is caused to flow from the furnace. The stream conditioning section of the apparatus may also be equipped with a stream and radiation shield, if desired. In the apparatus of FIG. 4, cooling the outlet orifice prolongs the orifice life and although this promotes a "cold" skin on the emergent flow stream, this is of no consequence as the subsequent plasma conditioning treatment will raise the overall stream temperature to the optimum temperature for fibre formation, thus effectively overcoming the problems attributable to "cold" skin and hence, greatly reducing or eliminating the formation of shot.

The combination of plasma arc furnace melter and plasma stream conditioning apparatus as described possesses a number of further advantages:
  the cooler outlet orifice prolongs life, thus overcoming the problem of wear and cleaning; and
  the apparatus facilitates the production of fibres from materials which hitherto have not been possible to fabricate in fibre form on a viable basis, for example, zirconia, mullite and alumina.

Using the process of the invention, it is now also possible not only optimally to condition the stream thermally, but also to effect optimal valence changes by the gaseous reaction of plasma gases with the molten stream. For example, by maintaining an oxygen component in the plasma gases, at least a part of the melt stream will become oxidised to its highest valence form. In such cases, longer fibres will form than when some of the components in the melt stream are in their lower valence states.

By using various amounts of nitrogen or ammonia as the plasma gas, it is possible effectively to nitride the volume of melt passing through the electrical coupling area of the plasma arcs. Thus, significant qualities of silicon oxynitrides, sialons and other nitrided species can be formed in the liquid stream. Fibres produced from such chemically altered streams have been found to be significantly stronger than fibres made from untreated streams.

In order to attain high energy fluxes over small melt surface areas when desired, it is possible to use a multiplicity of cathodic and anodic electrodes at about the same level on the melt stream as long as the anode and cathode polarities are alternated next to each other. This arrangement is designated as A-B-A-B-A-B polarity where A represents anodic electrodes and B represents cathodic electrodes. For optimum electrical balance an odd number of anode and cathode electrode pairs are required because of the associated field effects. These multiple electrodes may be symmetric in relationship with each other and the stream, or they may be located at different included angles, different tip spacings and different tip alignments to accomplish both selective and reinforcement of thermal and/or chemical treatment of the melt stream.

When the liquid streams are electrically conductive, as in the case of molten glasses and refractory oxides, moving the cathode and anode torches apart in the direction of the stream will allow further stream heating by causing an electric current to flow along the stream thereby resulting in increased ohmic heating of the stream. To minimize stream deflection when fiberizing is desired, it is advantageous to have pairs or multiple pairs of cathodes and anodes in which case the falling stream is well behaved and does not move significantly on the fiberizing rotors.

Alternatively, when a hot uncoated metallic nozzle or orifice is used, the nozzle or orifice may be made either anodic or cathodic with either one or a multiplicity of plasma arc electrodes of opposing polarities placed downstream of the nozzle or orifice to effect the desired ohmic heating.

The plasma arc torches used in the present invention may be either DC or AC plasma arc torches. When using alternating currents, one electrode or sets of electrodes are cathodic for one half of the electrical cycle and anodic for the other half of the cycle. The other electrode or sets of electrodes will be maintained at opposing polarities.

While direct current plasma arcs are inherently more stable than alternating current plasmas, it is possible to effect the desired stream conditioning using the less stable alternating current plasma by adjusing the electrode spacings sufficiently close so as to maintain stable AC plasma jets.

In the case of direct current plasma arcs, when a multiplicity of DC electrodes are used, multiple plasma arcs impinge upon the stream in the plasma coupling zone. This impingement of DC plasma arcs on the stream in one coupling zone results in the formation of an axially-directed magnetoplasmadynamic pumping force. Desirable effects of this pumping phenomena include:
1. enhanced suction of the liquid stream into the plasma coupling zone together with desired reaction gases including those for subsequent fiberization, and
2. focusing of the electrical and thermal coupling of the plasma energy into the melt stream.

The magnetoplasmadynamic pumping effect can be augmented by using the known effects of a water-cooled constrictor and/or an externally generated magnetic field on the plasma gases. The water cooled constrictor effectively reduces the cross sectional area of the plasma arc by cooling and thereby decreasing the electrical conductivity of the outer surface of the arc. This in turn produces horizontal pinching forces on the liquid stream, again causing it to accelerate and reduce in diameter.

Whilst it has been known to use an external field to produce pinching affects on plasma gases, the unique electron flow patterns associated with the spatially coupled plasma arcs requires unique external electron flows to produce similar effects. In one modification of the invention, the DC electron flow in the coupled plasma arcs may be directed initially at an angle to the melt stream as the electrons are emitted from the cathode, and then be caused to move at a reversed angle as the electrons move toward the anode. By directing an appropriate DC electric circuit through external conductors an electron flow in directions in opposition at all times to the plasma electron flow may be created, thereby causing a significant pinching effect of the plasma arcs to occur. The electric circuit in the external conductors may be modulated from zero flow to significant levels, thus modulating the pinching effect of the plasma arc on the melt stream.

While it is preferred for the liquid stream being treated to be a falling melt stream, the scope of the invention extends similarly to streams that are ejected horizontally or angularly from orifices or nozzles.

EXAMPLE 1

The melter shown in FIG. 4 was used to liquify a melt stream of 60% $SiO_2$, 24% CaO, 15% MgO and 1%

$Al_2O_3$. This stream was continuously poured from the melter at a rate of 630 kgs/hr forming approximately 0.1 cm diameter melt stream at an optical temperature of 1500° C. Two DC plasma electrodes were directed toward each other, one being anodic and the other cathodic in polarity. The electrodes were inclined downstream at approximately 60° from the vertical. Each electrode tip was spaced approximately 40 mm from the surface of the melt stream. The electrodes were directed towards each other in the same plane as the melt stream.

In one test the cathodic plasma gas was argon which was introduced at a rate of 0.85 cubic meters per hour and the anode gas was argon introduced at a rate of 1.42 cubic meters per hour. In another test the plasma gas was nitrogen with flow rates of 2.83 cubic feet per hour for both the cathode and anode. The input power to the plasma arcs was varied from 15 to 85 KW. The temperature of the melt stream was measured before and after the plasma was started using an Ircon Mod Line Plus 7000 Series Infrared pyrometer which was not sensitive to the characteristic wave lengths of the plasma radiation.

With the input power at 85 KW, the flow rate was reduced to 180 kgs/hr at which time the surface of the melt stream overheated with large quantities of fume formation.

Figure 5:
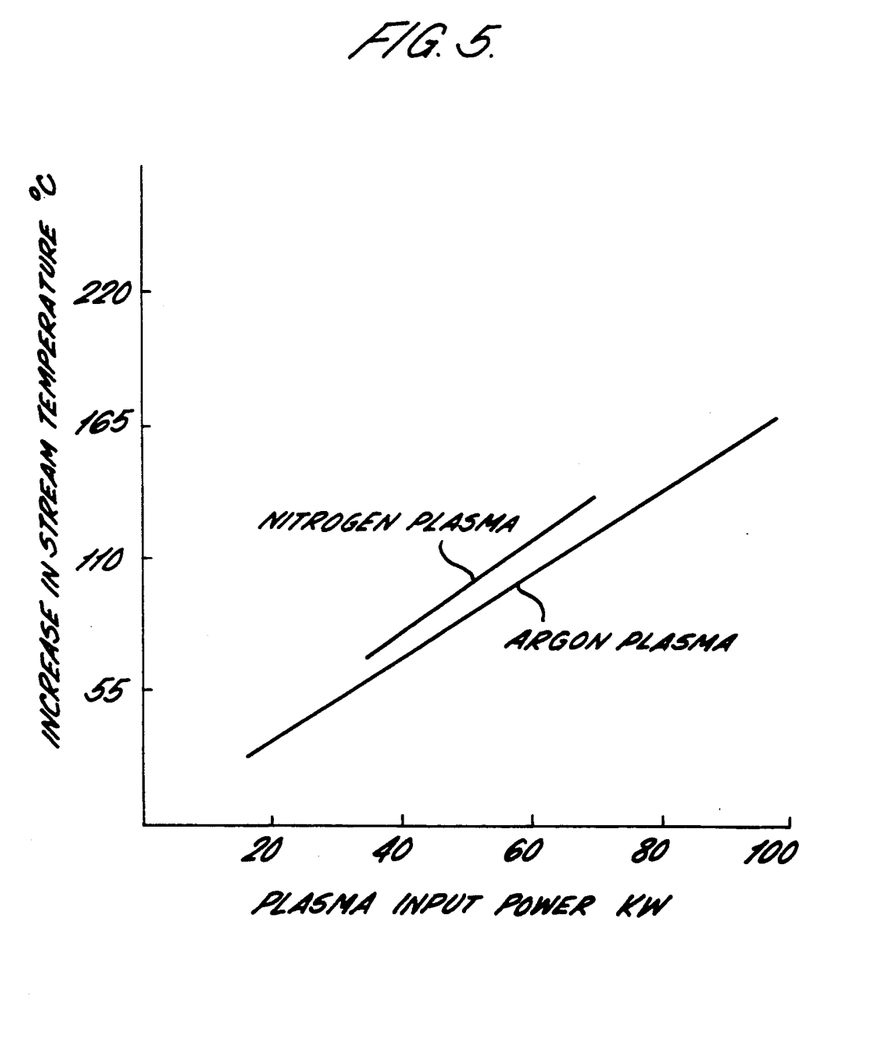
FIG. 5 shows the temperature pick up by the melt stream as a function of plasma power and plasma gas.

FIG. 5 shows the relationship between the temperature increase of the melt stream at 630 kg/hr pour rate as a function of the input plasma power and the plasma gas used. The test data indicated that it was possible to increase the temperature of the melt stream in a controllable fashion from about 20° to 65° C. Measurements were also made on the width of the melt stream using a filar eyepiece on a telescopic mount. It was observed that as the temperature of the stream increased the width of the stream decreased from 0.1 centimeters to 0.08 centimeters with input plasma powers of 50 KW.

The efficiency of thermal pick up by the stream was found to be fairly uniform with respect to the input power from the power supply.

The exiting stream was then fiberized using conventional fiberizing rotors. High fibre yields were obtained with significantly lower shot contents when the plasma was being used to condition the melt stream. With 80 KW of input plasma power the fibre product formed contained an average of 29% of unfiberized shot as compared with 38% of unfiberized shot when the plasma was turned off.

In the above example it is possible to enhance the efficiency of the thermal pick up by the melt stream using metal blocks properly positioned with respect to the plasma gases. To accomplish this two water cooled copper blocks 1.25 cm thick by 7.5 cm long and 5.0 cm wide were placed with the narrow edge facing the plasma tail flame and located parallel and behind the flame. The blocks were then progressively pushed toward the plasma arcs causing the plasma arcs progressively to pinch in towards the melt stream. At a block separation distance of 5.0 cm the efficiency of the plasma power was increased by 5 percentage points from 40 to 45%.

This pinching effect may be further enhanced by imposing a DC current along the two external conductors in a direction opposing the electron flows in the plasma arcs. Since the electrons change their flow direction as they move across the melt stream, it is important to wire the external circuit so that the electrons in the external circuit always flow in an opposing direction to the electrons in the plasma arcs. With current flows of approximately 800 amps in the plasma arcs, a matching current of 800 amps in the external conductor causes the plasma arcs to pinch significantly further in towards the melt stream, with an additional 5 percentage point increase in thermal efficiences of from 45 to 50%.

The fibres produced using the argon plasma were examined via infrared spectroscopy to determine silicon-oxygen bond stretching due to nitrogen pick up by the falling stream. These bonds showed significant stretching indicating an implantation of several percent of nitrogen in the stream. The nitrogen source is believed to be from the air that is pumped into the plasma arcs because of magnetoplasmadynamic forces.

EXAMPLE 2

A basaltic rock containing 9.2% total iron of which 85% was ferrous iron, was melted and poured through a water cooled orifice at a 360 kg/hr pour rate. A DC plasma arc torch configuration similar to that of Example 1 was used but with oxygen in the plasma column. The glass after the plasma treatment contained only 30% ferrous iron as a result of the oxidation treatment. Upon fiberizing, the basaltic fibres formed were long and silky as compared to the considerably shorter fibres made without the plasma treatment.

We claim:

1. A process for the treatment of a continuous or perturbated stream of molten glass or refractory oxide, which process consists essentially of passing said stream of molten glass or refractory oxide through a plasma arc coupling zone in which at least two plasma arcs are electrically and thermally coupled at the surface of the molten stream in order to raise both the bulk temperature of the stream and the temperature of the outer surface of the stream of glass or refractory oxide, and fiberizing the molten glass or refractory oxide.

2. Process according to claim 1 wherein the plasma arcs are generated by at least two plasma electrodes, at least one electrode acting as the cathode and at least one electrode acting as the anode.

3. Process according to claim 1 wherein the stream of molten glass or refractory oxide is passed through a zone in which at least three pairs of plasma arcs are coupled together at the surface of the molten glass or refractory oxide stream, with alternating polarity between the electrodes and with each cathodic-anodic electrode pair being connected to a separate individual power source.

4. Process according to claim 2 wherein the plasma electrodes are inclined at an angle to the vertical in a direction selected from the group consisting of downstream and upstream.

5. Process according to claim 4 wherein the plasma electrodes are symmetrically disposed, each being at an angle of from 50° to 70° to the vertical.

6. Process, according to claim 1 for the treatment of a stream of molten glass or refractory oxide wherein the stream of molten glass or refractory oxide is passed through a zone in which plasma arc electrodes of opposing polarities are separated in the direction of travel of the stream, thereby to effect additional ohmic heating of the molten stream.

7. Process according to claim 1 wherein the plasma arcs are formed using a gas selected from the group consisting of argon, nitrogen, oxygen, helium, ammonia and combinations and mixtures thereof as an ionizing gas.

8. Process according to claim 1 wherein the material to be treated is melted in a plasma arc furnace.

9. Process according to claim 8 wherein the plasma arc furnace is equipped with twin plasma electrodes.

10. Process according to claim 9 wherein an orifice from the furnace is cooled.

11. The process according to claim 1 wherein the molten glass or refractory oxide is selected from the group consisting of a wollastonitic composition, a mineral wool composition or other silicate composition.

12. Process according to claim 1 wherein the plasma arcs are formed using a gas selected from the group consisting of oxygen, nitrogen and ammonia and a chemical reaction of the gas with the molten stream occurs.

13. Process according to claim 1 wherein the plasma arcs are produced using a direct current supply.

14. Process according to claim 13 wherein an external arc electrical circuit is superimposed upon a plasma arc field, with the electron flow in the external circuit being in opposition to the current flow in the coupled plasma arcs.

15. Process according to claim 1 wherein the molten glass or refractory oxide is passed to a fibre forming apparatus.

16. Process for the treatment of a stream of a conductive molten glass or refractory oxide material which consists essentially of passing the stream of molten material through a zone in which one or more plasma arcs of the same polarity impinge on the surface of the molten stream, the arc or arcs being coupled through the stream to a nozzle or an orifice through which the stream is passed into said zone, and the nozzle or orifice being maintained at the opposite polarity relative to the plasma arc, thereby to effect additional ohmic heating of the molten stream, and fiberizing the molten material.

17. Process according to claim 1 for use in the formation of fibres from a molten glass or refractory oxide.

18. Process according to claim 1, wherein the plasma arcs, which are electrically and thermally coupled at the surface of the molten stream, effect chemical reactions between the plasma and the molten stream passing through the plasma arc coupling zone.

19. Process according to claim 18, wherein the chemical reaction comprises at least partial nitridation of the molten stream.

20. Process according to claim 18, wherein the chemical reaction comprises at least partial oxidation of the molten stream.

21. Process according to claim 18, wherein the chemical reaction comprises effecting a valency change of a component of the molten stream.

22. Process according to claim 1, wherein the molten material is selected from the group consisting of zirconia, mullite and alumina.

* * * * *